United States Patent
Bradley et al.

(10) Patent No.: US 12,154,458 B2
(45) Date of Patent: Nov. 26, 2024

(54) EMERGENCY RESPONSE TRAINING SYSTEM

(71) Applicant: Lion Group, Inc., Dayton, OH (US)

(72) Inventors: Brian Bradley, Albany, NY (US); Ra Monne Donell Perez-Pearson, Menands, NY (US)

(73) Assignee: LION GROUP, INC., Dayton, OH (US)

( * ) Notice: Subject to any disclaimer, the term of this patent is extended or adjusted under 35 U.S.C. 154(b) by 236 days.

(21) Appl. No.: 17/065,937

(22) Filed: Oct. 8, 2020

(65) Prior Publication Data
US 2022/0114904 A1 Apr. 14, 2022

(51) Int. Cl.
| | |
|---|---|
| *H04W 4/80* | (2018.01) |
| *A62C 99/00* | (2010.01) |
| *G09B 9/00* | (2006.01) |
| *H04B 1/3827* | (2015.01) |
| *H04M 11/04* | (2006.01) |
| *H04W 4/90* | (2018.01) |
| *G06F 1/16* | (2006.01) |
| *H04W 84/10* | (2009.01) |

(52) U.S. Cl.
CPC ............ *G09B 9/00* (2013.01); *A62C 99/0081* (2013.01); *H04B 1/3833* (2013.01); *H04M 11/04* (2013.01); *H04W 4/80* (2018.02); *H04W 4/90* (2018.02); *G06F 1/1637* (2013.01); *H04W 84/10* (2013.01)

(58) Field of Classification Search
CPC ............ G09B 9/00; H04W 4/90; H04W 4/80; H04W 84/10; H04B 1/3833; H04M 11/04; G06F 1/1637

USPC .......................................................... 455/521
See application file for complete search history.

(56) References Cited

U.S. PATENT DOCUMENTS

| | | | | | |
|---|---|---|---|---|---|
| 5,226,818 | A | * | 7/1993 | Feiock | A62C 99/0081 434/226 |
| 5,447,437 | A | * | 9/1995 | Joynt | G09B 9/00 434/226 |
| 5,518,402 | A | * | 5/1996 | Tommarello | G09B 9/00 434/226 |
| 5,823,779 | A | * | 10/1998 | Muehle | F41G 3/2655 434/21 |
| 5,823,784 | A | * | 10/1998 | Lane | G09B 9/00 434/226 |
| 5,920,492 | A | * | 7/1999 | Montag | G06T 15/00 434/226 |

(Continued)

OTHER PUBLICATIONS

"Realistic Fire Training Tools & Scenarios," by Lion Group, Inc., 23 pages (Feb. 2019).

(Continued)

*Primary Examiner* — April G Gonzales
(74) *Attorney, Agent, or Firm* — Thompson Hine LLP

(57) ABSTRACT

A training device system including a mobile phone simulator having a manually carryable housing and a controller positioned in the housing. The simulator includes a touch screen coupled to the housing and operatively coupled to the controller, wherein the touch screen is configured to selectively display a numerical keypad. The simulator further includes a short-range radio transceiver positioned in the housing, wherein the simulator is configured to, in response to proper operation of the numerical keypad by a user, transmit a signal via the transceiver.

23 Claims, 14 Drawing Sheets

(56) References Cited

U.S. PATENT DOCUMENTS

| | | | | |
|---|---|---|---|---|
| 6,129,552 A * | 10/2000 | Deshoux | G09B 19/00 | 434/226 |
| 7,175,439 B2 * | 2/2007 | Darois | G09B 19/00 | 434/226 |
| 7,748,983 B2 * | 7/2010 | Blackburn | A62C 99/0081 | 434/226 |
| 7,965,257 B2 * | 6/2011 | Perkins | H04N 9/12 | 345/1.3 |
| 8,096,810 B2 * | 1/2012 | Blackburn | A62C 99/0081 | 434/226 |
| 8,427,391 B2 * | 4/2013 | Perkins | H04N 9/12 | 345/1.3 |
| 9,773,424 B2 * | 9/2017 | Blackburn | G09B 19/00 | |
| 9,971,678 B2 * | 5/2018 | Poulin | G06Q 20/145 | |
| 10,356,241 B2 * | 7/2019 | Meor | H04M 7/006 | |
| 10,540,908 B2 * | 1/2020 | Blackburn | G09B 9/00 | |
| 10,757,132 B1 * | 8/2020 | Powers | H04L 63/1441 | |
| 10,758,758 B2 * | 9/2020 | Schmitt | A62C 37/36 | |
| 11,020,624 B2 * | 6/2021 | Williamson | G09B 9/00 | |
| 11,376,459 B2 * | 7/2022 | Bradley | G01N 27/228 | |
| 12,020,354 B2 * | 6/2024 | Brebner | G06T 11/20 | |
| 2003/0115076 A1 * | 6/2003 | Gomez | G06Q 30/02 | 434/350 |
| 2003/0121672 A1 * | 7/2003 | Spaniol | A62C 99/0081 | 169/5 |
| 2005/0015268 A1 * | 1/2005 | Diaz | G06Q 40/08 | 434/350 |
| 2006/0240392 A1 * | 10/2006 | Clifton | A62C 99/0081 | 434/226 |
| 2007/0116207 A1 * | 5/2007 | Brunson | G09B 7/02 | 379/90.01 |
| 2007/0218436 A1 * | 9/2007 | Blackburn | A62C 99/0081 | 434/226 |
| 2010/0304345 A1 * | 12/2010 | Blackburn | A62C 99/0081 | 434/226 |
| 2011/0039237 A1 * | 2/2011 | Skare | H04L 63/14 | 434/118 |
| 2011/0294547 A1 * | 12/2011 | Ni | G06F 8/61 | 455/557 |
| 2015/0079558 A1 * | 3/2015 | Blackburn | G09B 19/00 | 434/226 |
| 2015/0079559 A1 * | 3/2015 | Blackburn | G09B 9/00 | 434/226 |
| 2015/0366518 A1 * | 12/2015 | Sampson | A61B 5/7264 | 600/509 |
| 2017/0296854 A1 * | 10/2017 | Bradley | H04N 5/33 | |
| 2017/0296855 A1 * | 10/2017 | Williamson | G09B 19/003 | |
| 2019/0118016 A1 * | 4/2019 | Severijns | G09B 19/00 | |
| 2019/0197059 A1 * | 6/2019 | Yu | H04W 4/029 | |
| 2019/0253861 A1 * | 8/2019 | Horelik | H04W 64/006 | |
| 2020/0285464 A1 * | 9/2020 | Brebner | G06F 8/36 | |
| 2020/0285788 A1 * | 9/2020 | Brebner | G06F 18/251 | |
| 2020/0285977 A1 * | 9/2020 | Brebner | G06N 5/022 | |
| 2020/0327029 A1 * | 10/2020 | Prakash | G06N 5/04 | |
| 2021/0058508 A1 * | 2/2021 | Leavitt | H04M 3/242 | |

OTHER PUBLICATIONS

"R.A.C.E. Station," by Lion Group, Inc., 3 pages (Jun. 2020).

"NextGen Hero Project—Our Mission," NextGen Hero Project, LLC, 6 pages (2019).

"NextGen Hero Project—Our Story," NextGen Hero Project, LLC, 4 pages (2019).

* cited by examiner

EMERGENCY RESPONSE TRAINING SYSTEM

The present disclosure is directed to an emergency response training system, and more particularly, to an emergency response training system including a phone simulator.

BACKGROUND

Emergency response training systems can be used to train and prepare users in responding to emergency situations, such as fires, chemical leaks, explosions or other hazardous conditions. Such training systems can include flame simulators, fire alarms and smoke alarms to simulate a various hazardous conditions. In real-world situations, a user would be expected to typically have a mobile telephone or cellular telephone (collectively termed a "mobile phone" herein) in their possession. However, many existing training systems lack the capacity to incorporate a mobile phone or mobile phone simulator.

SUMMARY

In one embodiment, the invention is a training device system including a mobile phone simulator having a manually carryable housing and a controller positioned in the housing. The simulator includes a touch screen coupled to the housing and operatively coupled to the controller, wherein the touch screen is configured to selectively display a numerical keypad. The simulator further includes a short-range radio transceiver positioned in the housing, wherein the simulator is configured to, in response to proper operation of the numerical keypad by a user, transmit a signal via the transceiver.

DETAILED DESCRIPTION

Figure 1:
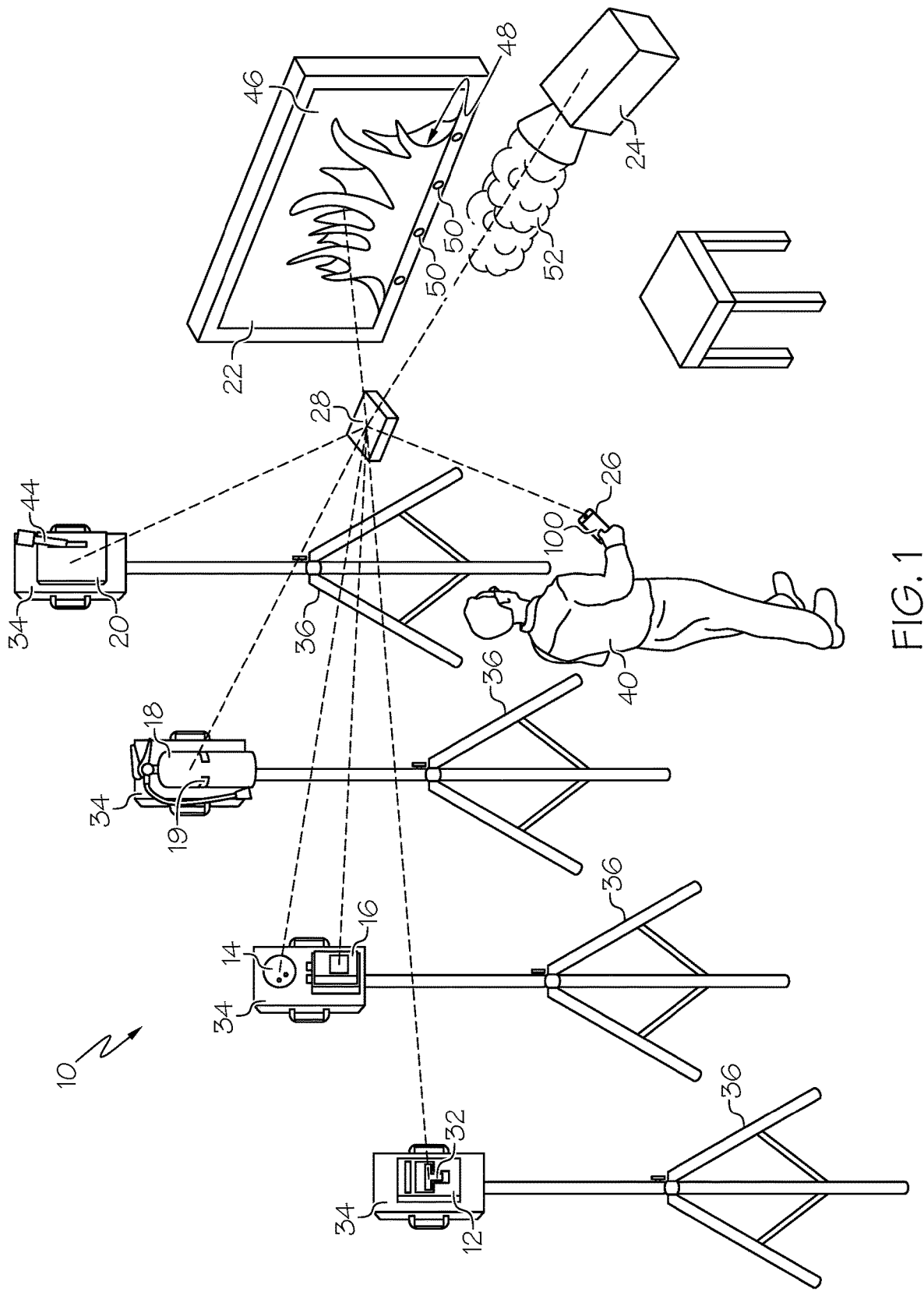
FIG. 1 is a schematic representation of one embodiment of the training system, shown in conjunction with a user.
Figure 2:
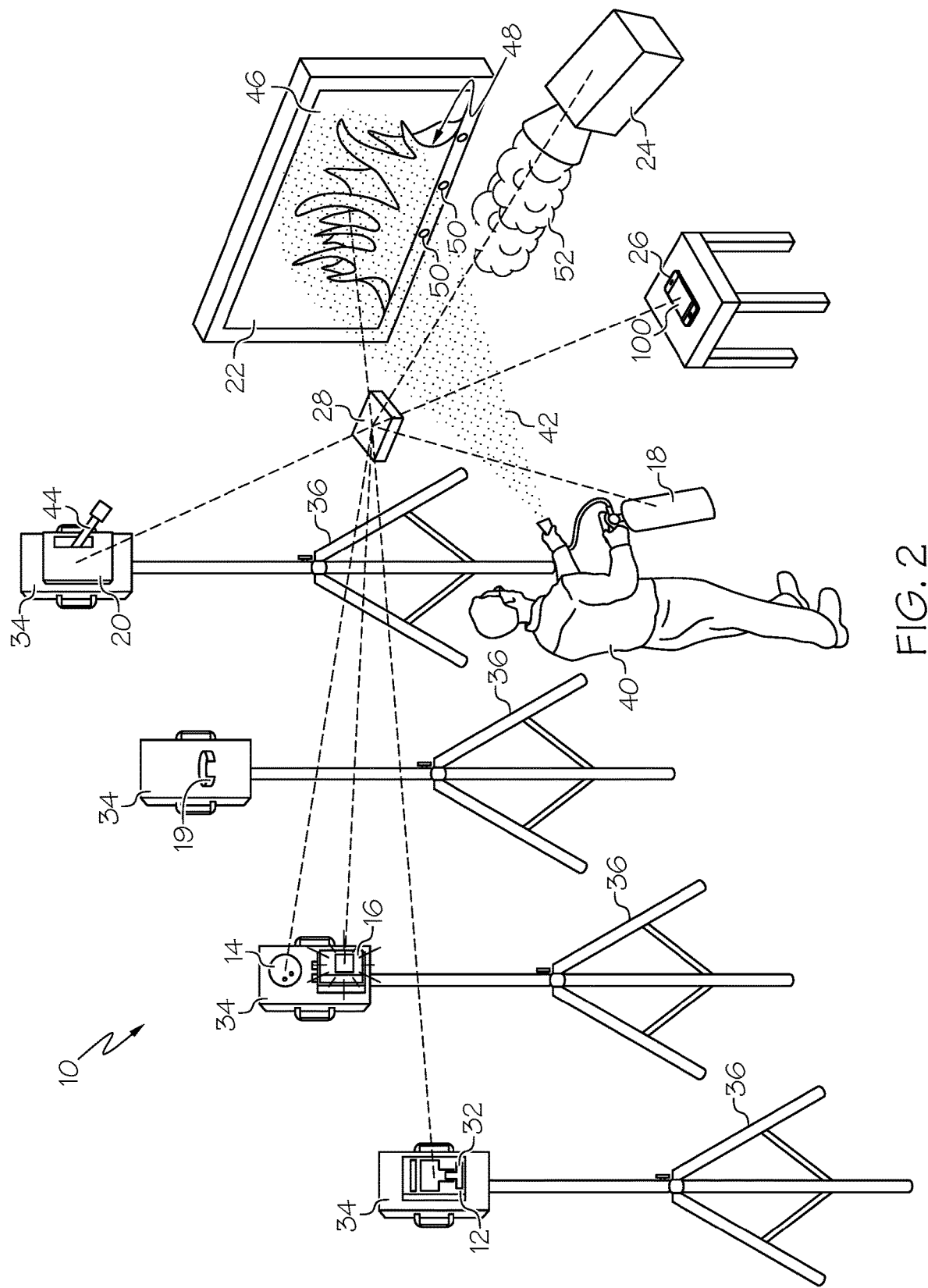
FIG. 2 is a schematic representation of the system of FIG. 1, with the user operating the fire extinguisher.

With reference to FIGS. 1-2, in one embodiment the training system 10 can include a plurality of subcomponents or interactive props/devices including a simulated fire alarm 12, a real or simulated smoke alarm/smoke detector 14, an annunciator 16, a real or simulated fire extinguisher 18, a simulated cutoff switch 20, a fire simulator 22, a smoke machine 24 and a mobile phone simulator 26, each of which can be operatively coupled to a network bridge 28. The fire alarm 12 can include a manually actuable handle 32 which can typically reside in its upper or un-actuated state, as shown in FIG. 1. The handle 32 can be moved to its lowered, actuated state (FIG. 2) by a user or operator 40 to thereby actuate the fire alarm 12 (or simulate actuating a fire alarm) which sends a signal to the bridge 28 and/or other subcomponents 14, 16, 18, 20, 22, 24, 26 via a communication network which is described in greater detail below. The bridge 28 will then process the signal in a manner which will be described in greater detail below. The simulated fire alarm 12 can be mounted to or include a backing panel 34 which is a generally a rectangular prism in the illustrated embodiment. The backing panel 34, in turn, can be coupled to and supported by a collapsible/retractable tripod 36.

Figure 8:
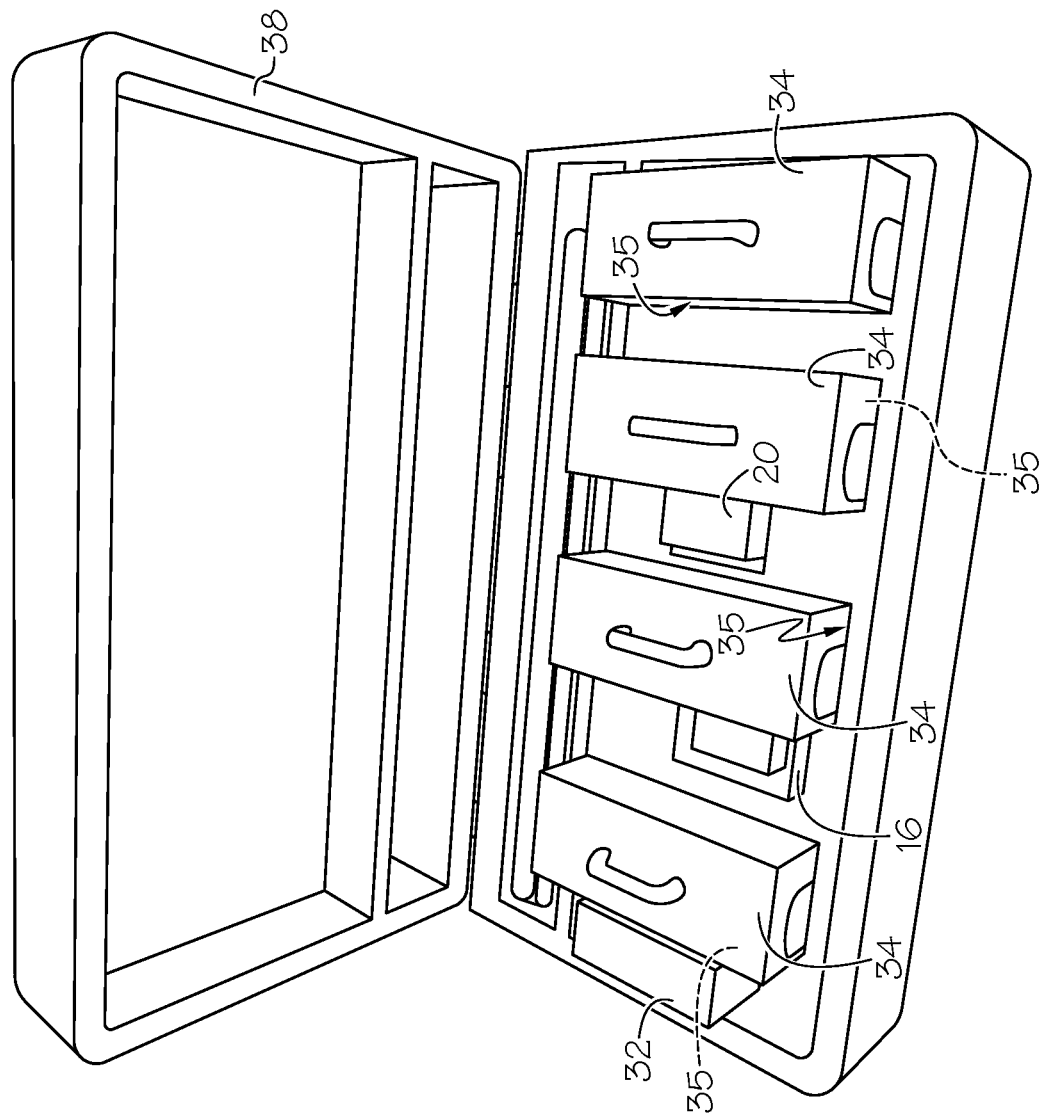
FIG. 8 is a front perspective view of a storage case storing various subcomponents of the systems of FIGS. 1 and 2 therein.

The bridge 28 can sense or be informed as to the status of the handle 32/fire alarm 12. In particular, in one case the smoke detector 14 can include sensors and/or a processor (not shown) that sense the position of the handle 32 and which are operatively coupled to the bridge 28 and/or other subcomponents 14, 16, 18, 20, 22, 24, 26 such that the state/position of the handle 32 can be communicated to the bridge 28 and/or other subcomponents 14, 16, 18, 20, 22, 24, 26. In some cases the bridge 28 may be able to send a signal to cause an actuator (not shown) to move the handle 32 (e.g., in one case to return the handle 32 to its start, or un-actuated, position shown in FIG. 1). The fire alarm 12 (and indeed each subcomponent 12, 14, 16, 18, 20, 22, 24, 26) can be powered by its own rechargeable battery, or in the alternative or in addition can be powered by primary batteries, or connected to an electrical power grid via an electrical plug or the like. As shown in FIG. 8, in one embodiment an openable/closeable storage case 38 can be provided which includes cut-outs 35 sized and configured to closely receive each of the panels 34 and associated subcomponents 12, 14, 16, 18, 20 thereon such that the panels 34 can be conveniently stored and carried in a single storage case 38.

The smoke detector 14 can be a simulated smoke detector in some cases which is not configured to actually detect smoke but is nevertheless configured to send an output signal, such as an audible signal, and/or a visual signal, such as a flashing light, when triggered. In this case the smoke detector 14 can be configured to emit its output signal(s) at predetermined time or in response to a predetermined event in a training/simulation, such as a certain period of time after a fire is first displayed on the fire simulator 22. The smoke detector 14 may be used to train a user 40 as to how to test a smoke detector 14, how to check or change batteries, etc. In other cases the smoke detector 14 can be fully functional and configured to sense particulates, such as real or simulated smoke or other particulates, by various technologies, including by photoelectric and/or ionization sensors included or incorporated therein. The smoke detector 14 can be operatively coupled to the bridge 28 and/or other subcomponents 12, 16, 18, 20, 22, 24, 26 and thereby send an output signal to the bridge 28 and/or annunciator 16 when the smoke detector 14 detects sufficient levels of smoke, or is otherwise triggered.

The annunciator 16 can be configured to emit audio and/or visual outputs, such as a loud audio alarm, flashing lights, etc. when activated. FIG. 2 includes a visual indication of the annunciator 16 emitting such light and/or sound. The smoke detector 14 and/or the annunciator 16 can be operatively coupled to the bridge 28 ad/or other subcomponents 12, 18, 20, 22, 24, 26 to send signals to the bridge 28 and/or be controlled by the bridge 28 and/or other subcomponents 12, 18, 20, 22, 24, 26. In particular, during simulations, the annunciator 16 may be able to be directly or indirectly controlled/operated by the bridge 28 and/or other subcomponents 12, 14, 18, 20, 22, 24, 26 to provide its annunciator outputs. The smoke detector 14 and annunciator 16 are, in the illustrated embodiment, coupled to a common backing panel 34, but can be coupled to separate backing panels 34 if desired. Indeed various of the subcomponents 12, 14, 16, 18, 20 can be coupled to the backing panels 34 in various combinations.

The fire extinguisher 18 can be removably coupled to its associated backing panel 34 by a bracket 19 or the like, and can be removed therefrom (see FIG. 2) for operation by the user 40. The user 40 may be able to manually operate the extinguisher 18 to project a real and/or simulated extinguishant 42. In one embodiment, the extinguishant 42 is liquid water sprayed from the extinguisher 18 at pressures comparable to those provided by fire hydrants, pump trucks or the like, although the extinguishant can also be sprayed at different or lower pressures. The extinguisher 18 may also or instead spray extinguishants 42 in the form of solids (such as a chemical powder), liquids (such as water, foam or combinations thereof) or gases (such as inert gases including $CO_2$) of various forms and at various pressures. In another embodiment, the extinguisher 18 also or instead emits an extinguishant in the form of a directed signal that is not manually detectable by the user (i.e. may not have any noticeable mass) which can be visible or not visible by the user, such as electromagnetic waves (more particularly, emissions in the IR frequencies, lasers or the like).

The extinguisher 18 and/or its associated panel 34 can be coupled to the network bridge 28 and/or other subcomponents 12, 14, 16, 20, 22, 24, 26 such that removal and/or replacement of the extinguisher 18 from its bracket 19/associated backing panel 34 are communicated to the bridge 28 and/or other subcomponents 12, 14, 16, 20, 22, 24, 26. In yet another embodiment, the operation and/or output of the extinguisher 18 is tracked by various sensor and/or processors (not shown) carried on the extinguisher 18 and communicated to the bridge 28 and/or other subcomponents 12, 14, 16, 20, 22, 24, 26. In some cases, multiple extinguishers 18 may be made available to the user 40, and in some cases the different extinguishers may be identified for use with different types of fires (e.g. electrical fires, grease fires, wood burning fires, etc.)

The simulated cutoff switch 20 can include a lever 44 that is movable between an "on" or unactuated position (as shown in FIG. 1) and a "off" or actuated position as shown in FIG. 2. The cutoff switch 20 can be shaped and configured to simulate the appearance of the cutoff switch of an electrical control box or electrical panel, and be coupled to an associated backing panel 34. The cutoff switch 20 can include sensors and/or processors (not shown) that sense the position of the lever 44 and which are operatively coupled to the bridge 28 and/or other subcomponents 12, 14, 16, 18, 22, 24, 26 such that the state/position of the lever 44 can be communicated to the bridge 28 and/or other subcomponents 12, 14, 16, 18, 22, 24, 26. Furthermore, in some cases the bridge 28 and/or other subcomponents 12, 14, 16, 18, 22, 24, 26 may be able to send signals to cause an actuator (not shown) to move the lever 44 (e.g., in one case return the lever 44 to its starting, or "on," position).

The fire simulator 22 can include a screen 46 formed or positioned on a front surface thereof and can in one case be made of material that can withstand relatively high fluid pressures associated with extinguishants 42 used in actual or simulated firefighting. The fire simulator 22 can also include or be connected to a fire simulator controller (not shown) that is operatively coupled to an array of visible light emitters positioned behind the screen 46. In one embodiment, the visible light emitters may be light emitting diodes (LEDs) or organic LEDs (OLEDs) or the like although other technologies may be utilized such as, for example, digital light processing light sources and/or IR digital light processing light sources to provide simulated/digital flames.

The fire simulator 22 can generate and display an image 48 to the user 40 in the form of simulated fire/flames. The fire simulator 22 can include one or more sensors 50 configured to sense an extinguishant 42 sprayed or directed at the fire simulator 22. The sensors 50 may in one case be temperature sensors, such as thermistors, or take any of a wide variety of other forms, including nearly any device or transducer having physical properties that change when an external stimulus, such as a simulated, actual or virtual extinguishant 42, is applied to the sensors 50 and/or that can otherwise sense the extinguishant 42.

The sensors 50 of the fire simulator 22 can provide an output that can include information relating to the sensed extinguishant 42, such as the nature and direction of the sensed extinguishant 42, volume of applied extinguishant 42, and timing of the application of the extinguishant 42, the manner of application of the extinguishant 42, and such output may be provided to the fire simulator controller and/or bridge 28 and/or other subcomponents 12, 14, 16, 18, 20, 24, 26. For example, proper firefighting technique, such as when the extinguishant 42 is aimed at the proper location for the proper duration and in a proper method, can cause the fire simulator controller/bridge 28 to reduce the size of the flame image 48, or cause the flame image 48 to grow at a reduced rate. Conversely, relatively poor firefighting technique, such as where the extinguishant 42 is not aimed at the proper locations, or for improper durations, or in improper methods, can cause the fire simulator controller/bridge 28 to increase the size of the flame image 48. Further details relating to the fire simulator 22 can be found in U.S. Pat. No. 9,773,424, titled Fire Fighting Training System with Integrated Extinguishant Sensor, the entire contents of which are hereby incorporated by reference.

The smoke machine/smoke generator/fog machine 24 (collectively termed a "smoke machine" herein) can be operatively coupled to the fire simulator 22 and/or bridge 28 and/or other subcomponents 12, 14, 16, 18, 20, 26. The smoke machine 24 can generate smoke/simulated smoke by vaporizing source fluids/liquids such as water and/or glycol-based and/or glycerin-based fluids, or through the atomization of fluids/liquids such as mineral oil. The source fluid/liquid is typically vaporized or atomized inside a housing of smoke machine 24, and then forced into the surrounding environments by a fan, blower, or other air movement device. Upon exiting the smoke machine 24, the vaporized or atomized fluid mixes with the cooler outside air, and the vapor condenses, resulting in a thick visible smoke 52 which is not generated through combustion.

The bridge 28 can include or take the form of a controller, processor, computer or the like that can, in one case, be operatively or communicatively coupled to one or more, or each of the subcomponents 12, 14, 16, 18, 20, 22, 24 (including the phone simulator 26, which will be described in greater detail below) via short-distance/short-range wireless communication technology/protocol such as a BLUETOOTH® transmission system for a low energy wireless technology. In one case, the bridge 28 can provide an output that is visually detectable by the user 40 and/or an instructor. For example, in one case the bridge has various lights that can light up when each of the subcomponents 12, 14, 16, 18, 20, 24, 26 is operated or activated. In this manner an instructor can track the order in which the lights are activated to ensure the user 40 is carrying out emergency response steps in the proper order.

Additionally, or alternatively, other short-distance wireless communication technologies besides Bluetooth may be utilized (e.g., ZigBee, WiFi, and the like). The short-distance wireless communication may be able to transmit processable data without significant loss at distances of less than about 100 yards in one case, or less than about 50 yards in another case, or less than about 20 yards in another case. The short-distance wireless communication may be able to transmit processable data without significant loss at distances of greater than about 5 yards in one case or greater than about 10 yards in another case. In addition, if desired the bridge 28 may be connected to each of the subcomponents 12, 14, 16, 18, 20, 22, 24 by a hardwired connection, which may provide faster and more robust connections/communications, but the presence of wires can in some cases impose physical/spacing restrictions and potential complications.

In an exemplary implementation, Bluetooth mesh technology is used for the mesh network of training system 10 of FIG. 1 to enable the bridge 28 to communicate with the subcomponents 12, 14, 16, 18, 20, 22, 24, 26 through a personal area network, although as noted above other short-distance wireless communication technologies may be utilized. In the exemplary implementation, Bluetooth mesh technology, promulgated by the Bluetooth Special Interest Group, is a Bluetooth profile established on the Bluetooth Low Energy (BLE) standard whereby Bluetooth mesh networks can be implemented. Bluetooth mesh networking enables many-to-many (m:m) device communications and is optimized for creating large-scale device networks. For example, the mesh network of training system 10 of FIG. 1 includes bridge 28 in short-distance wireless communication with subcomponents 12, 14, 16, 18, 20, 22, 24, 26. The bridge 28 and subcomponents 12, 14, 16, 18, 20, 22, 24, 26 can each include transmitters, receivers and/or transceivers that can transmit and/or receive the short-distance wireless signals in the manner described herein.

In operation, the short-distance wireless communication for the mesh network of training system 10 described herein (e.g., a Bluetooth mesh network), provides a network that allows for decentralized communication between each subcomponent 12, 14, 16, 18, 20, 22, 24, 26, which allows for increased ranges. For example, the mesh network provides a decentralized communication network such that the network topology can have disjointed paths (i.e., messages can go from subcomponent A to subcomponent C, even if they are not in range of each other, so long as there is an intermediate component B and/or the bridge 28 in range of both). The decentralized communication mesh network allows for significant benefit to deployment because the system 10 does not require that every subcomponent 12, 14, 16, 18, 20, 22, 24, 26 be within range of every other subcomponent 12, 14, 16, 18, 20, 22, 24, 26, only that each subcomponent 12, 14, 16, 18, 20, 22, 24, 26 is within range of one subcomponent 12, 14, 16, 18, 20, 22, 24, 26 spanning back to the bridge 28. Additionally, the decentralized communication mesh network also allows for the possibility of "relay" subcomponents, which act as network relays that can be used to place individual subcomponents 12, 14, 16, 18, 20, 22, 24, 26 far away (e.g., like a breadcrumb path for the network messages to return back to the bridge 28). In some implementations, 100-meter range subcomponent-to-subcomponent distances are utilized, but with a decentralized communication mesh network, the 100-meter range can be extended farther if the subcomponents 12, 14, 16, 18, 20, 22, 24, 26 are arranged in a straight line.

The bridge 28 and/or subcomponents 12, 14, 16, 18, 20, 22, 24, 26 can include transceivers that use UHF radio transmissions and/or operate in the 2.4 GHz short-range radio frequency band, in one case at frequencies between about 2.5 and about 2.5 GHz in one case, or between about 2.402 and 2.480 GHz in another case, or 2.400 and 2.4835 GHz in yet another case, or in another case any license-free bandwidth. In other cases the bridge 28 and/or subcomponents 12, 14, 16, 18, 20, 22, 24, 26 can include transceivers that operate in the 315 MHz, 433 MHz, 860 MHz, 915 MHz, 5 GHz radio band, or other bands as desired. The bridge 28 and/or subcomponents 12, 14, 16, 18, 20, 22, 24, 26 can include transceivers that transmit at powers between −20 dBm (0.01 mW) to +20 dBm (100 mW), and in any case less than about 1 Watt in one case, or less than about 0.5 Watts in another case, or less than about 0.1 Watts in another case, and have a receiver sensitivity of minimum receiver sensitivity of at least −70 about dBm in one case, or at least about −82 dBm in another case.

The phone simulator 26 can include an interactive display and touch screen 100 and be operated in the manner of a typical smartphone/mobile device/mobile phone. The phone simulator 26 may be configured to wirelessly communicate with the bridge 28 via a short-distance wireless communication protocol as described above. However, as described in greater detail below, the phone simulator 26 may lack the ability to connect with/communicate via a cellular network or mobile phone network (e.g., to prevent a user 40 from connecting to an actual emergency response system/network during a simulation). In particular, the phone simulator 26 may be a scaled down version of a smartphone (e.g., scaled down with respect to functionality). For example, the phone simulator 26 may include typical hardware as a smartphone such as a screen 100 (LCD, display, touch screen), keypad, microphone 89, speaker 91, battery (which can be wireless chargeable in some cases), USB port, antenna, memory unit (RAM, ROM), camera, application/protocol layers running on CPU, ON/OFF switch 106, and Bluetooth/GPS features, and the like).

The phone simulator 26 can include a housing 102 which can be a generally rectangular prism shape which can easily fit into the hand of a user 40 be manually carryable. In one case, the largest side/surface of the phone simulator 26/housing 102 has a size of at least about four square inches but less than about 36 square inches, in another case less than about 120 square inches. The smallest dimension of the phone simulator 26/housing 102, e.g., its thickness, can be less than about 1 inch in one case, or less than about 0.5 inches in another case. In one case the touch screen 100 comprises a majority of the surface area of one side (the largest side) of the phone simulator 26/housing 102, or more particularly, in one case at least about 90 percent surface area of the side.

The phone simulator 26 can include a phone simulator controller (not shown) positioned in the housing 102, and the touch screen 100 can be coupled to/contained in the housing 102 and operatively coupled to the phone simulator controller. The phone simulator 26 can have an internal battery/power source to power the touch screen 100, phone simulator controller, and other components thereof. The touch screen 100 can include or take the form of a dynamic electronic visual display which is configured to receive manual inputs from a user 40 and communicate the inputs to the phone simulator controller which can in turn communicate with the bridge 28. The touch screen 100 can also display outputs provided from the phone simulator controller and/or bridge 28.

The touch screen 100 can include or be operatively coupled to various sensors to sense a user's touch, such as resistance sensors and/or capacitive sensors to enable the user 40 to provide inputs. The microphone 89 can be operatively coupled to the phone simulator controller for sensing/receiving audio inputs, where the audio inputs can be stored on the phone simulator controller. The speaker or speakers 91 can be operatively coupled to the phone simulator controller and configured to play audio signals, such as recorded and/or transmitted audio signals in one case. The phone simulator 26 can include an on/off switch 106 and/or volume control buttons 108.

As noted above, the phone simulator 26 may lack the capability to operate as a mobile phone, but instead communicate via a wireless personal area network. Thus the phone simulator 26 (e.g., inside the housing 102 in one case) can lack or not be able to, and/or can lack any transceiver that can, transmit and/or receive at frequencies other than in the frequency bands identified above (e.g., in one case, other than in the 2.4 GHz short-range radio frequency band). The phone simulator 26 can lack and/or can lack any transceiver that can transmit at a power of greater than about 0.1 Watt in one case, or greater than about 0.5 Watts in one case, or greater than about 1 Watt in another case. The phone simulator 26 may lack a subscriber identity module (or SIM card) that is used to store an international mobile subscriber identity, and/or lack the ability to operatively connect to a SIM card (e.g. can lack a SIM card socket and/or associated pin connections and/or circuitry). In other words, in this case no SIM card is positioned in the housing 102 and/or phone simulator 26. The phone simulator 26 may lack or have no ability, even when fully powered up and fully operational, to connect to a public switched telephone network. The phone simulator 26 may lack, and not include, the hardware (e.g., the integrated circuitry, antenna, Tx/Rx switch, etc.) to connect to a cellular network/cellular carrier network (e.g., SIM card circuitry, baseband (L1/Layer1/physical layer) running on DSP which converts voice/data to be carried over GSM air interface, etc.).

Figure 4:
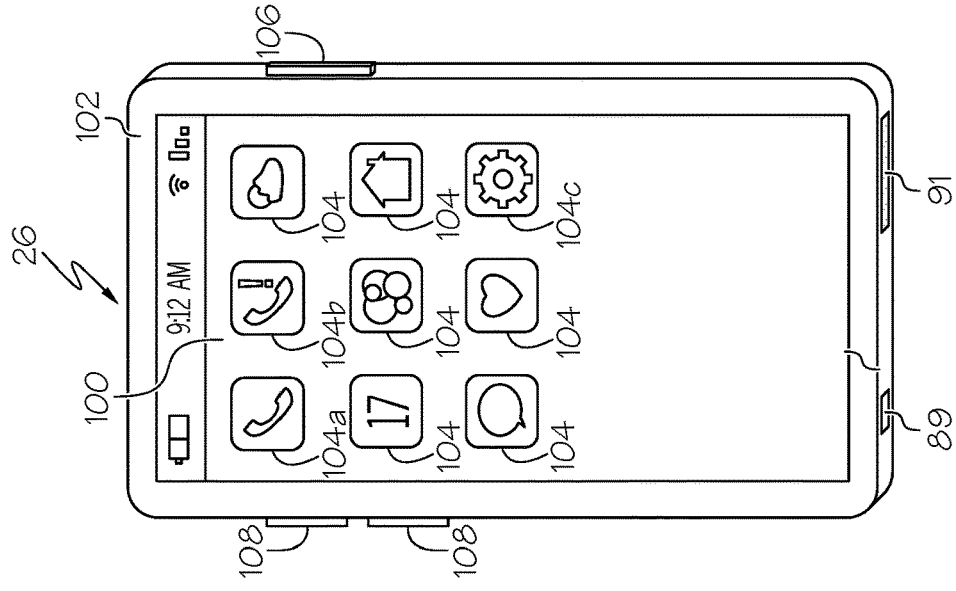
FIG. 4 is a front view of the mobile phone simulator of FIG. 3 in its unlocked and home state.
Figure 3:
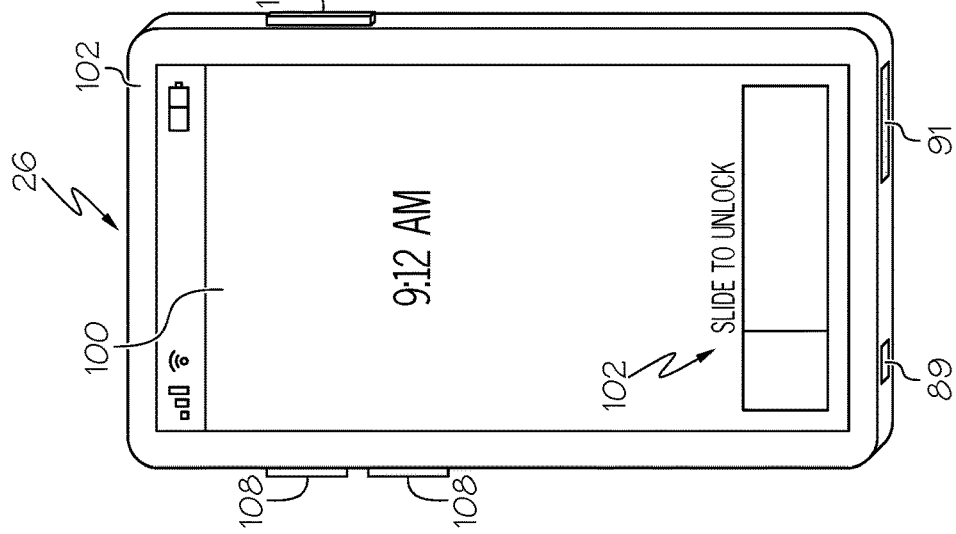
FIG. 3 is a front view of one embodiment of the mobile phone simulator of the system of FIGS. 1 and 2, in its locked state.

The phone simulator 26 can be configured to provide display outputs and provide a user experience which mimics existing smart phones, such as an Apple® iPhone®, Samsung® Galaxy® mobile phone, and other devices now existing or existing in the future. For example, with reference to FIG. 3, the phone simulator 26 can have a screen unlock feature 102 that is designed to be manually manipulated by a user 40 to unlock the phone simulator 26. As shown in FIG. 4, after the phone simulator 26 is unlocked, a home screen can be presented showing various icons 104 representing various apps. Some of the apps 104 may be active and able to be used/operated, while other of the apps 104 may be dummy icons or lead to inoperative screens when selected.

Figure 5:
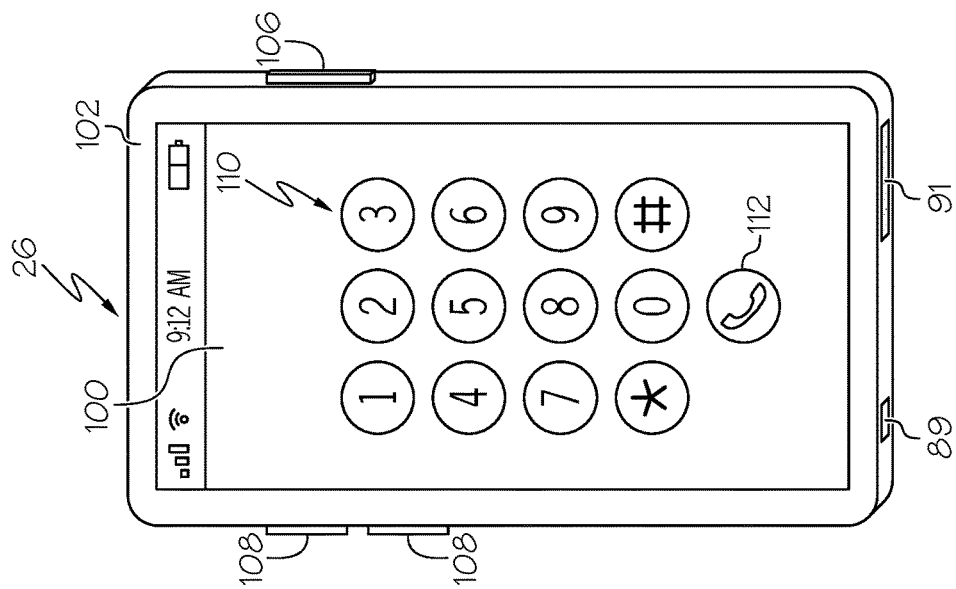
FIG. 5 is a front view of the mobile phone simulator of FIG. 4, showing a call keypad.

One of the displayed icons can be a call button 104a and/or an emergency call button or icon 104b which, when selected, pulls up a telephone keypad 110, as shown in FIG. 5. The keypad 110 may also be able to be accessed by various other user actions/swipes, such as in one case, from the unlock screen of FIG. 3, swiping up from the bottom of the screen 100, or some other predetermined action, to initiate an emergency call simulation. In that case that the keypad 110 is accessed through an emergency call procedure (e.g. by selecting the emergency call icon 104b or by swiping up or other predetermined gesture) the screen 100 may look the same as that shown in FIG. 5, except text/indicia such as "Emergency Call" or the like may be shown. In such an emergency call format, in existing functional mobile phones, the user may be able to make calls with a keypad 110, but the mobile phone will restrict which calls can be completed to only those which are recognized as emergency phone numbers (such as 911, recognized police and fire phone numbers).

Figure 6:
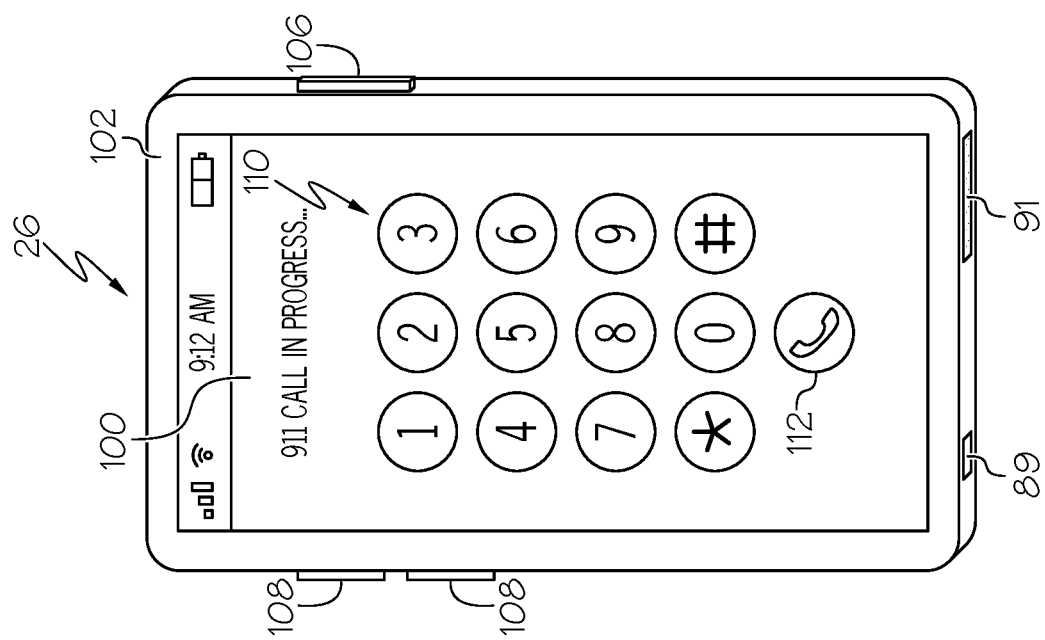
FIG. 6 is a front view of the mobile phone simulator of FIG. 5, showing a simulated emergency call in progress.

When the keypad 110 is displayed and active, the phone simulator 26/keypad 110 may be able to be operated to simulate a call to an emergency phone number (such as 911) or emergency telephone system or phone numbers (including seven digit dialing numbers or ten digit dialing numbers, etc.). When a button of the keypad 110 is selected, the selected number may be added/displayed at the top of the screen 100 to show the user's dialing action, and a tone may be played through the speaker 91. As shown in FIG. 6, when a user dials 911 or other predetermined emergency dial number using the phone simulator 26, and then presses the call button 112, the user 40 is determined to have at least partially successfully completed the emergency calling process. The phone simulator 26 then sends a wireless signal to the bridge 28 via the short-distance/short-range wireless communication technology/protocol. The phone simulator 26 is then triggered by the phone simulator controller and/or bridge 28 to play a recorded ring tone followed by a recorded message through the speaker 91 (which may be transmitted to the phone simulator 26 from the bridge 28 and/or stored on the phone simulator) so that the user 40 can hear and receive the recorded/transmitted message.

The recorded/transmitted message can take any of a wide variety of forms and in one case can simulate the answering of an emergency call or 911 call such as "This is 911 emergency services. What is your emergency?" This audio signal can be taken as confirmation that the user 40 has properly completed the emergency call. In another case, it may be possible for an instructor or other person to communicate with the user 40 via the instructor's own functional mobile phone and/or phone simulator 26 which is operatively coupled to the bridge 28, such as via Bluetooth or the like. In this case a more realistic, interactive calling experience can be provided to the user 40 and/or immediate instruction or training can be provided.

In any case, once the recorded/transmitted message is played through the speaker 91, the user 40 may then be cued or trained (by the recorded/transmitted message or by an instructor) to provide spoken information, such as details relating to the simulated emergency. The phone simulator 26 and/or bridge 28 may then record and/or analyze any spoken words or other audio output of the user 40 detected by the microphone 89 of phone simulator 26 so that it can be determined if the user 40 has properly reported the emergency (e.g., provided sufficient/proper details such as name, location, nature of emergency, identity and location of other persons subject to the emergency conditions, etc.). The phone simulator 26 and/or bridge 28 may ask a recorded question for the user 40 to respond to (e.g. "What is your location?") and the user's spoken response may be analyzed and/or recorded for review.

The simulated call can then be automatically "terminated" by the phone simulator 26 and/or bridge 28 after a predetermined period of time, such as by sending a dial tone and/or terminating the short range wireless transmission between the phone simulator 26 and the bridge 28. Of course, communications may not necessarily be "terminated" as the phone simulator 26 may remain in communication with the mesh network/bridge 28 even after the call is "terminated." The simulated call can also be terminated by the user 40 pressing the call button 112 on the phone simulator 26. The simulated call may also or instead be terminated by the phone simulator 26 and/or bridge 28 based upon speech recognition. For example, if the user says "Goodbye" or some other predetermined speech pattern, the phone simulator 26 and/or bridge 28 may recognize that the user is seeking to terminate the call and then initiate the call "terminate" protocol.

Figure 7:
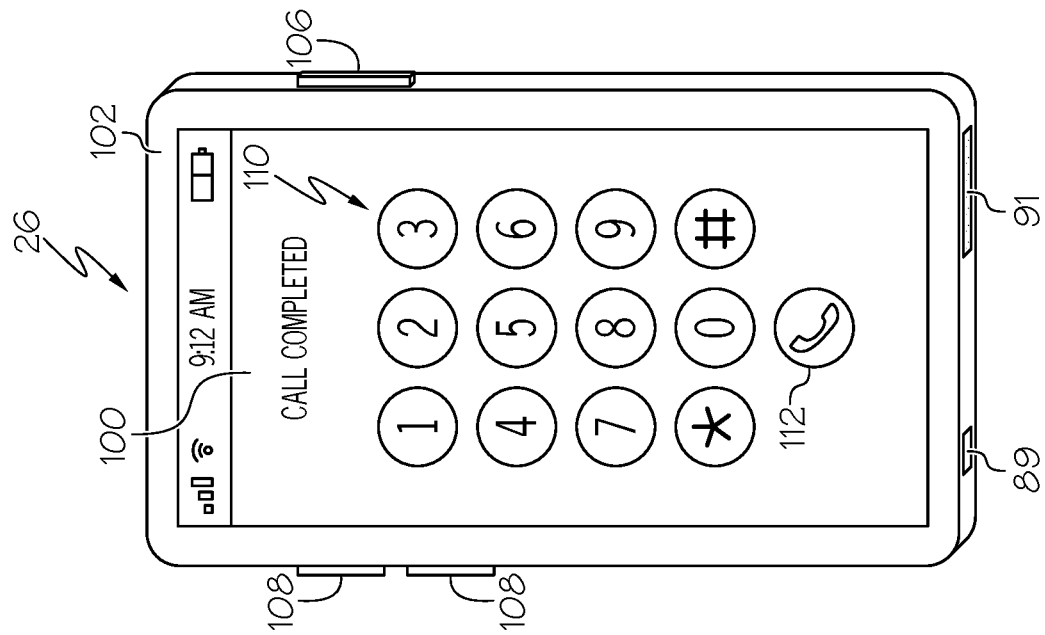
FIG. 7 is a front view of the mobile phone simulator of FIG. 6, after the simulated emergency call is completed.

Further alternately, the simulated call may be terminated after the phone simulator 26 and/or bridge 28 detects any speech by the user 40 (since the detected speech can be taken as an indication that the user 40 has properly initiated and completed the simulated call), or a predetermined period of time later, and/or after a period of silence. In yet another case, speech recognition may be used to ensure the user 40 conveys proper information. For example, the bridge 28/mesh network may cause the speaker 91 to ask the user 40 to state the user's location 40. If the user's speech indicates the correct information relating to location, then a correct response may be noted, and the call may be "terminated." In any case, after the simulated call is "terminated" a tone may be played through the speaker 91 and/or the message "Call Completed" or the like can be shown on the screen 100, as shown in FIG. 7, and/or a dial tone may be played by the speaker 91 and/or no more audio signals that are indicative of call are sent and/or played by the speaker 91.

In this manner, the phone simulator 26 can be used to provide a realistic training exercise for the user 40, but because the phone simulator 26 lacks the ability to connect to a cellular/mobile network, there is no risk of placing an inadvertent call to a real emergency call network. In addition, since the phone simulator 26 lacks the ability to connect to a mobile/cellular network, the phone simulator 26 can have reduced cost and weight, and increased durability.

In order to utilize the system 10 of FIGS. 1 and 2, subcomponents 12, 14, 16, 18, 20, 22, 24, and 26 can be set up in a single room or space, or, if desired, be spaced apart and placed in multiple rooms, spaces, etc. An initial emergency-indicating output, or a simulated hazardous condition, can then be presented to the user 40, such as, for example, displaying fire/flames on the fire simulator 22, causing smoke 52 to be emitted from the smoke machine 24, and/or causing the annunciator 16 to present an output.

Figure 9:
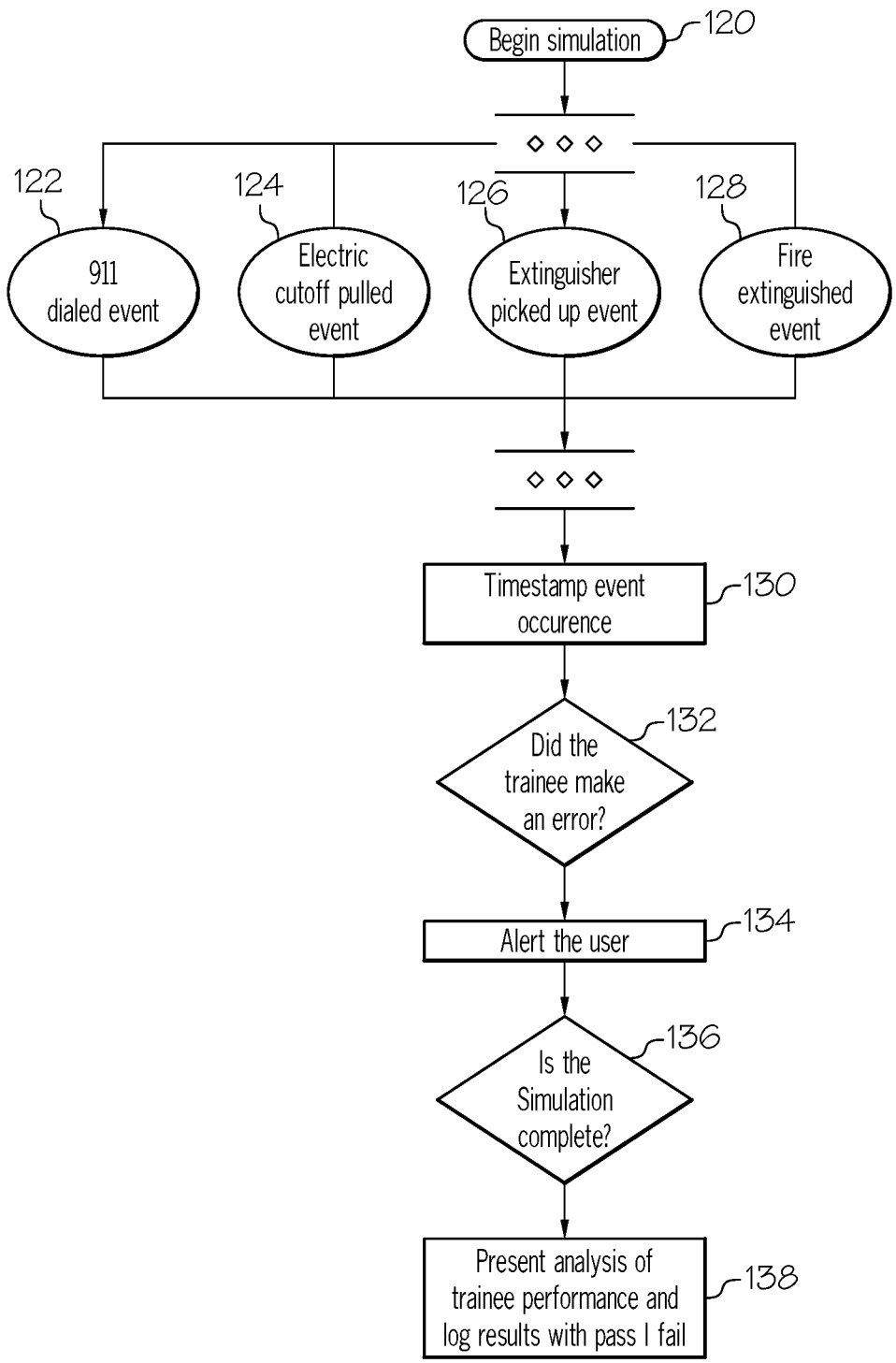
FIG. 9 is a flow chart of operations for a user utilizing the system of FIGS. 1 and 2.

FIG. 9 is a flow chart of operations for a user 40 utilizing the training system 10. For example, initiation of the training exercise is shown as step 120. The user 40 can then respond to the perceived outputs by choosing one or more of the following: 1) dialing 911 on the phone simulator 26 (step 122); 2) pulling the lever 44 on the cutoff switch 20 (step 124); 3) removing the extinguisher 18 from its panel 34 (step 126); 4) using the extinguisher 18 to extinguish the displayed flames (e.g., flame image 48) of the fire simulator 22 (step 128). Additionally, or alternatively, the user 40 can respond to the perceived outputs by other steps, including activating the fire alarm 12 by lowering the handle 32 to its actuated state, exiting the area, or taking various other actions.

The network bridge 28 can track and store some or all of the actions of the user 40, such as the order of operations and/or the time elapsed with time stamp operations (step 130). The network bridge 28 and/or an instructor can observe and oversee the training operations, and in some cases receive output from the bridge 28, can then determine if the user 40 made any errors (step 132) and provide feedback to the user 40 (step 134) to improve responsiveness of the user 40 to the presented conditions. For example, the bridge 38 can determine a quantitative error, such as a user violating a "script" or order of operations and/or timing of operations as defined by software stored on or accessible by the bridge 38. For instance, in one case a user 40 may operate the extinguisher 18 to attempt to extinguish an fire that is identified as an electrical fire (for example by the instructor, or by various props or displays), without first de-energizing the electrical source of fire by operating the lever 44 of the simulated cutoff switch 20. This can be construed as a quantitative error which can reduce a user's 40 score. Alternatively, the user 40 may for example use the phone simulator 26 to call 911 before actuating the handle 32 of the fire alarm 12 to alert people in the building, or the user 40 may dial the wrong emergency number, or the user 40 may use the wrong extinguisher 18 for the type of identified fire (when multiple extinguishers 18 are provided). The instructor, if utilized, can receive performance outputs from the bridge 38 and/or provide qualitative feedback to the user 40, such as if the user 40 did not properly respond to the "operator" during an simulated emergency call, or did not know where the fire alarm 12 is located, etc.

If the simulation is complete (step 136) the system 10 and/or instructor can give feedback to the user 40, including pass/fail feedback in one case (step 138). For example, in one case the user 40 may not have carried out steps in the proper manner, may have omitted certain steps, may have taken unnecessary steps, may have taken too long to implement certain steps, etc. If desired after receiving the feedback the user 40 can then repeat the simulation, under the same or different conditions, to improve their performance and reduce errors.

Figure 10A:
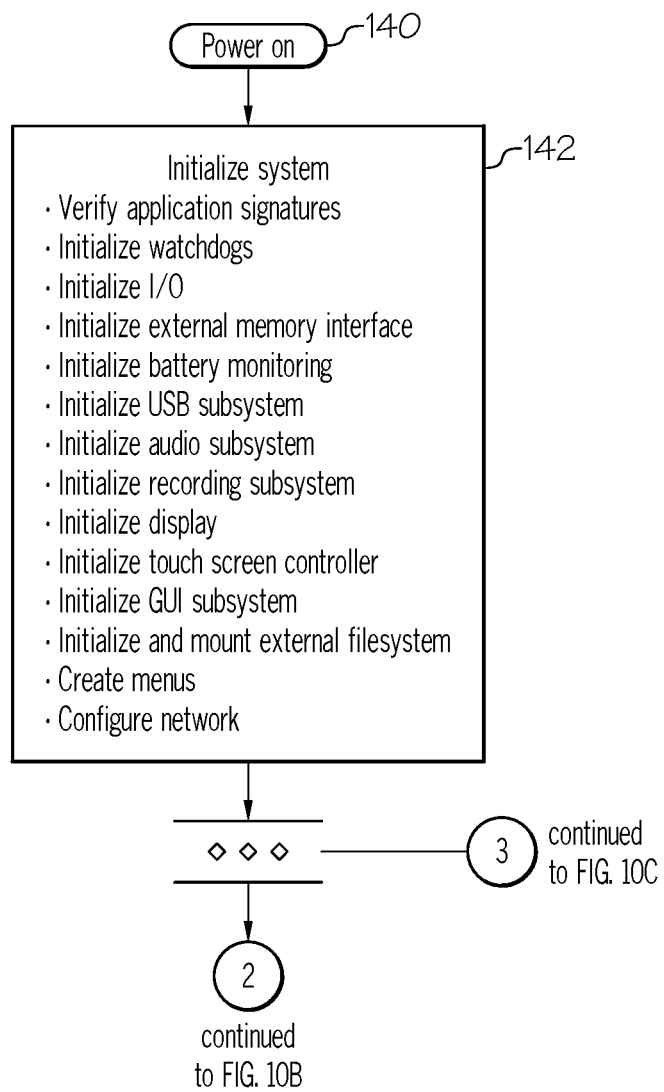
FIG. 10A is part of a flow chart illustrating operations of the mobile phone simulator of FIGS. 3-7.

FIGS. 10A-H illustrate a flow chart showing various functionalities of the phone simulator 26, which improves the user experience and realism of the simulation. In particular, FIG. 10A illustrates the initialization processes of the phone simulator 26. For example, at step 140, the phone simulator 26 is powered on, after which it proceeds to the initialization steps shown at step 142 (e.g., a plurality of verification, initialization, and configuration steps).

Figure 10B:
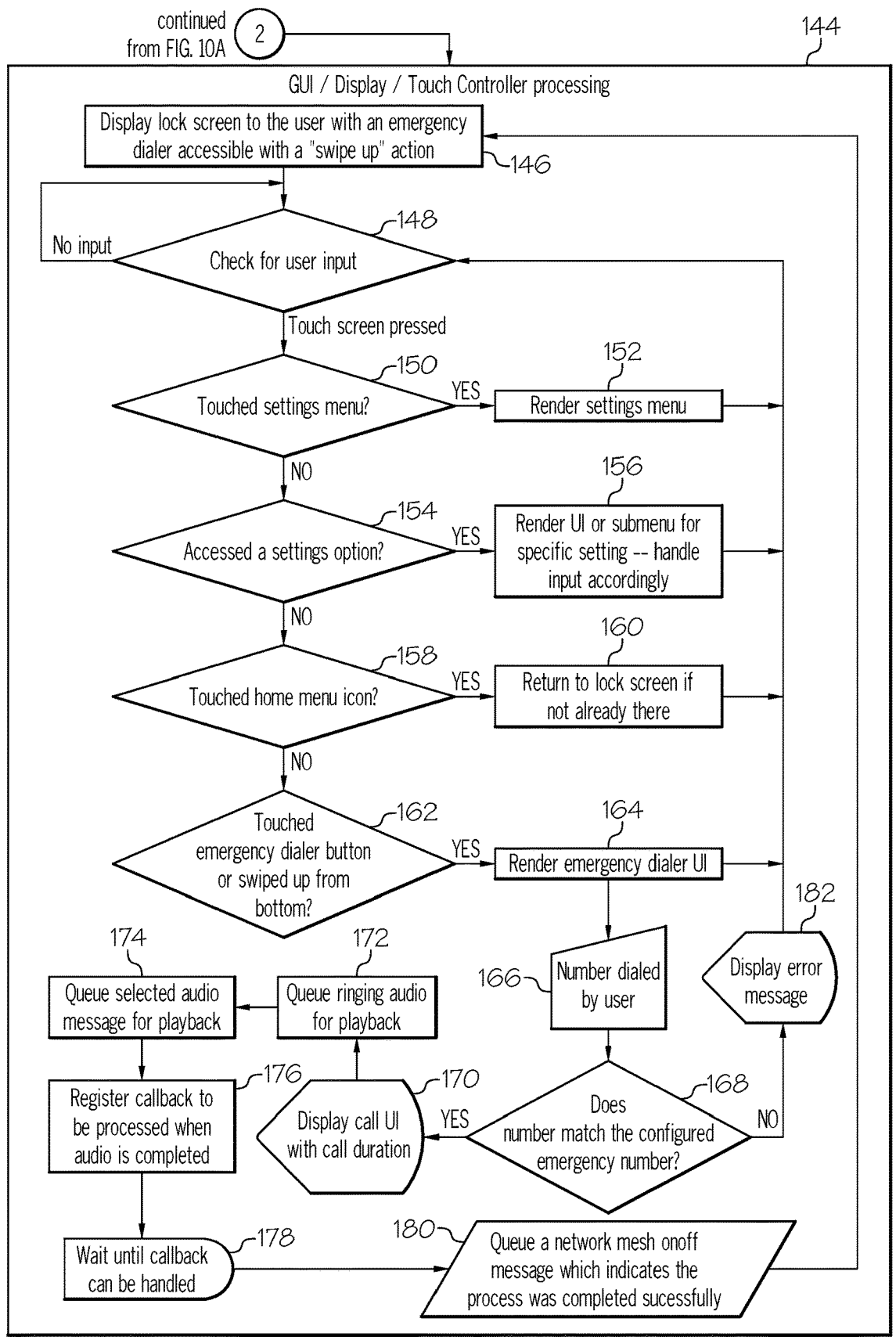
FIG. 10B is part of the flow chart indicated in FIG. 10A.

FIG. 10B illustrates the GUI/Display/Touch Controller processing 144. For example, at step 146, the lock screen is displayed to a user 40 (such as that shown in FIG. 3 in one case), where the emergency dialer (in one case, the keypad 110 shown in FIG. 5) can be accessed with appropriate action, such as swiping up or sideways. At step 148, the phone simulator 26 checks for user input at a regular and relatively short interval (e.g., every 10 ms). Alternatively, the phone simulator 26 can check for user input continuously (e.g., respond immediately to a user input).

After user input has been detected (e.g., at the touch screen 100) at step 148, then the phone simulator 26 determines the type of user interaction. For example, at step 150, if the setting menu is selected (such as selecting icon 104c of FIG. 4), the setting menu is rendered at step 152. At step 154, the phone simulator 26 checks whether the settings option is selected, and if so the phone simulator 26 proceeds to step 156 where a user interface or submenu is presented to the user 40 to adjust specific setting. If the setting menu and/or a setting option is selected, various setting of the phone simulator 26 can be adjusted via the touch screen 100 or other inputs, such as language, volume, screen brightness, emergency message selection (e.g. the message played back to the user 40 when the user has properly made a simulated emergency call), recording/confirming new recordings (e.g., recordings of the user 40 made during a training session) and adjusting the default emergency number (e.g., 911 or some other number). At step 158, the phone simulator 26 checks whether the home menu icon is selected, and if so the phone simulator 26 proceeds to step 160 where the screen 100 shows the lock screen, such as that of FIG. 3.

At step 162, the phone simulator 26 checks whether the emergency dialer button (e.g., icon 104*b* of FIG. 4) is selected, or if the screen 100 is presented with other appropriate emergency access actions, such as swiping up from the bottom. If the emergency dialer functionality is selected/activated, the phone simulator 26 proceeds to step 164 where the screen 100 show the emergency dialer user interface, such as that of FIG. 5 (in some cases, with additional, indicia, such as text "Emergency Call" displayed on the screen 100). At step 166 the user 40 can then dial an emergency number, and if the entered number is determined by the controller of the phone simulator 26 and/or network bridge 28 to be correct (step 168), the screen 100 displays a call user interface, with a call duration and other indicia (e.g. a ring tone, text such as "Call in Progress," etc.) suggesting a typical connected emergency phone call, for example as shown in FIG. 6 (step 170). On the other hand if, at step 168, if the number entered/dialed by the user 40 does not match the predetermined emergency number, an error message is displayed, as shown at step 182, and the user 40 is not presented with an indicia suggesting a completed call.

After step 170, the phone simulator 26 proceeds to step 172 where a ring tone is played by the speaker 91 of the phone simulator 26. At step 174, the audio playback is played by the speaker 91 of the phone simulator 26. At step 176 the phone simulator 26 registers a callback. For example, the system 10 can set a command/operation to be completed after the audio portion of the simulation (e.g. playing and/or recording audio) is complete. After registering a callback, the phone simulator 26 waits (e.g., in one case approximately 1 to 5 seconds) until callback can be handled. For example, the system 10 can send the mesh network a message and update the user interface to a pre-call state (e.g., home state, such as shown in FIG. 4). After the callback is handled at step 178, then at step 180, the phone simulator 26 queues a network mesh on/off message which indicates that the simulated emergency call process was completed successfully. An example of the network mesh messaging process 184 (e.g., Bluetooth mesh messaging) is further described herein with reference to FIG. 10C.

Figure 10C:
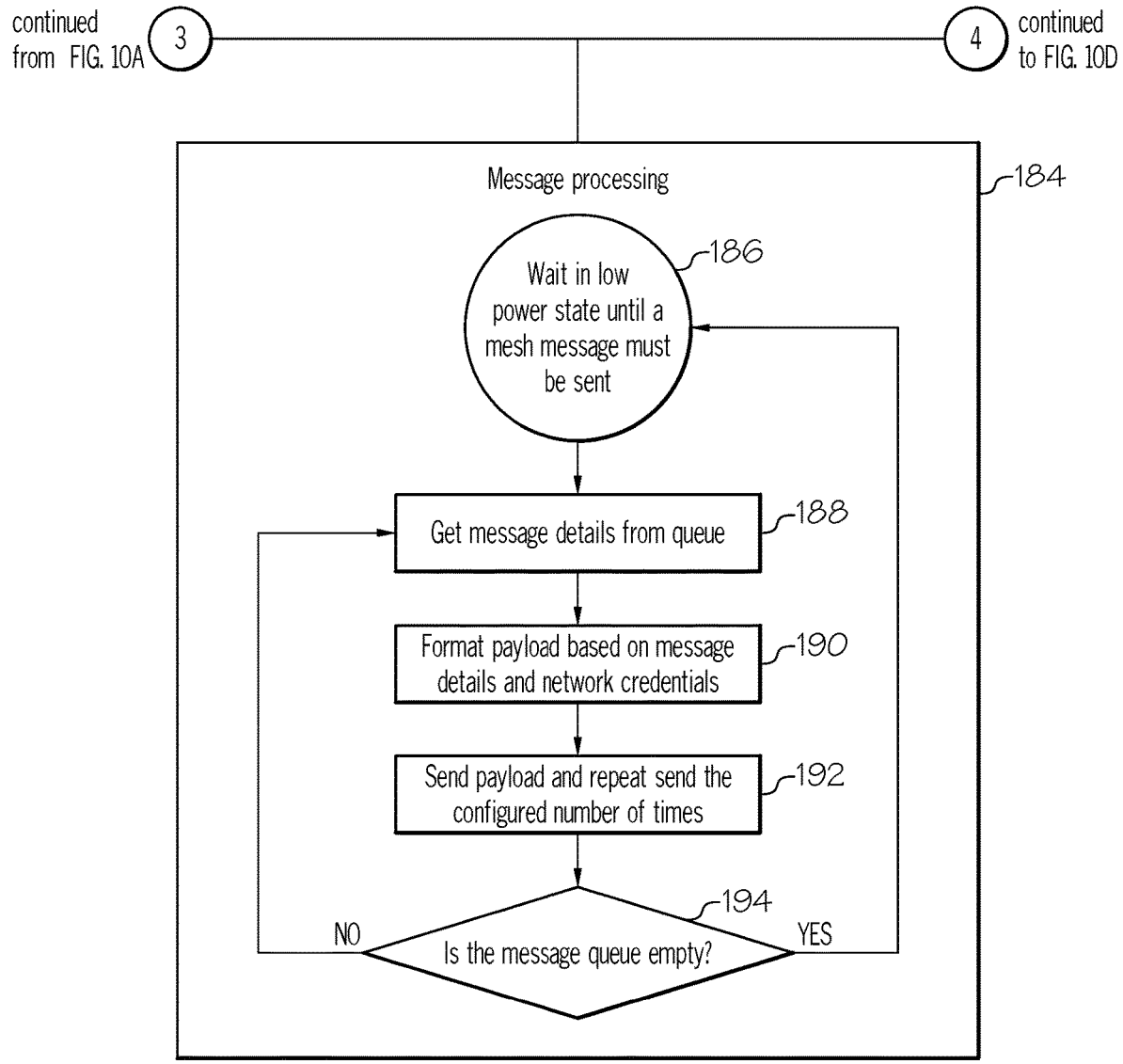
FIG. 10C is part of the flow chart indicated in FIG. 10A.

FIG. 10C illustrates a network mesh messaging process 184. For example, at step 186, the phone simulator 26 waits in a low power state until a mesh message needs to be sent. At step 188, after a mesh message has been queued, the phone simulator 26 receives the message details from the queue. At step 190, the phone simulator 26 formats the payload based on the message details and network credentials. Next, at step 192, the phone simulator 26 repeatedly sends the payload for a configured number of times (e.g., three times in one case). After the payload is sent in step 192, then the phone simulator 26 determines whether the message queue is empty (step 194). If the message queue is not empty, then the network mesh messaging process 184 proceeds to step 188 to receive the additional message details in the queue. If the message queue is empty, then the network mesh messaging process 184 proceeds to step 186 to wait in a low power state until another mesh message needs to be sent.

Figure 10D:
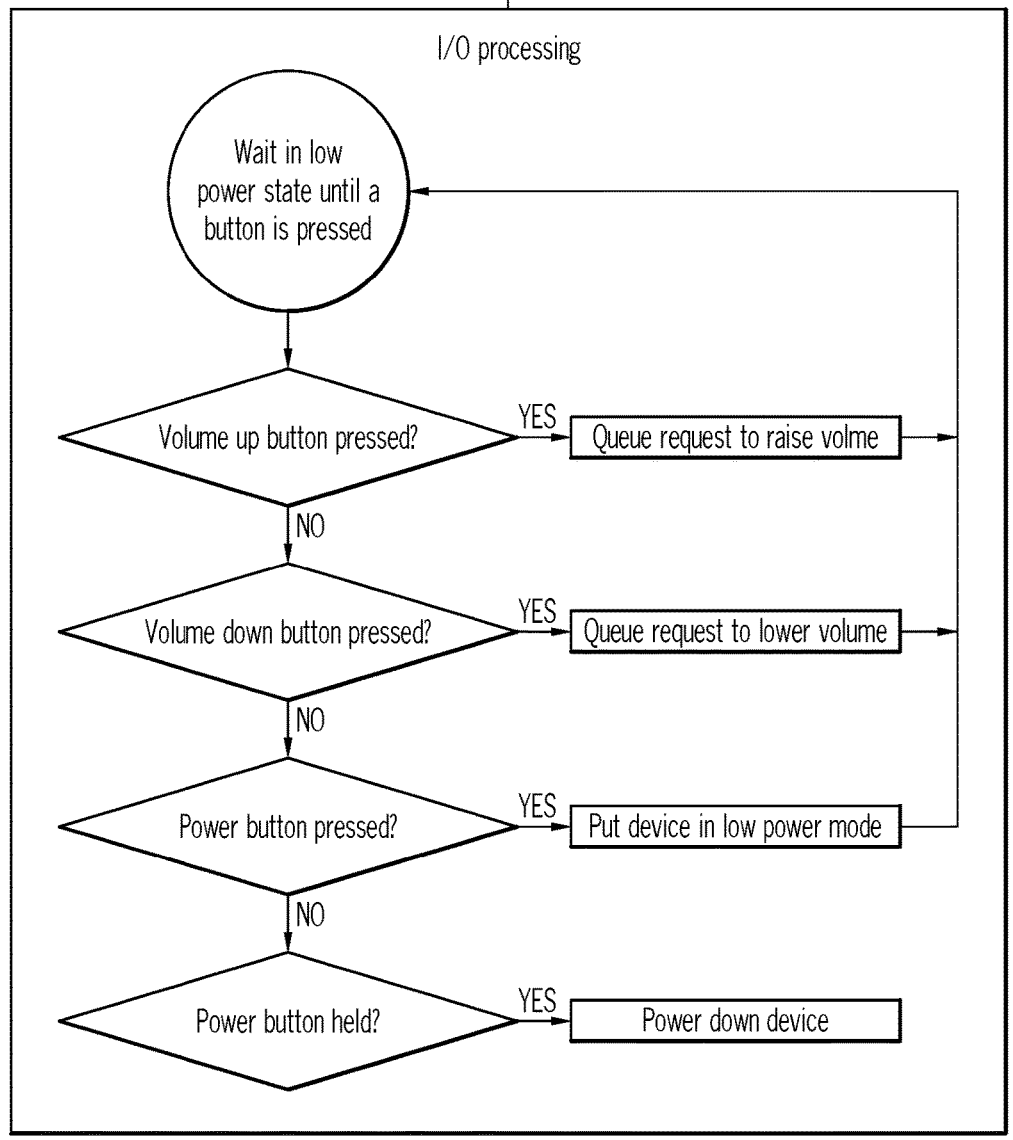
FIG. 10D is part of the flow chart indicated in FIG. 10C.
Figure 10E:
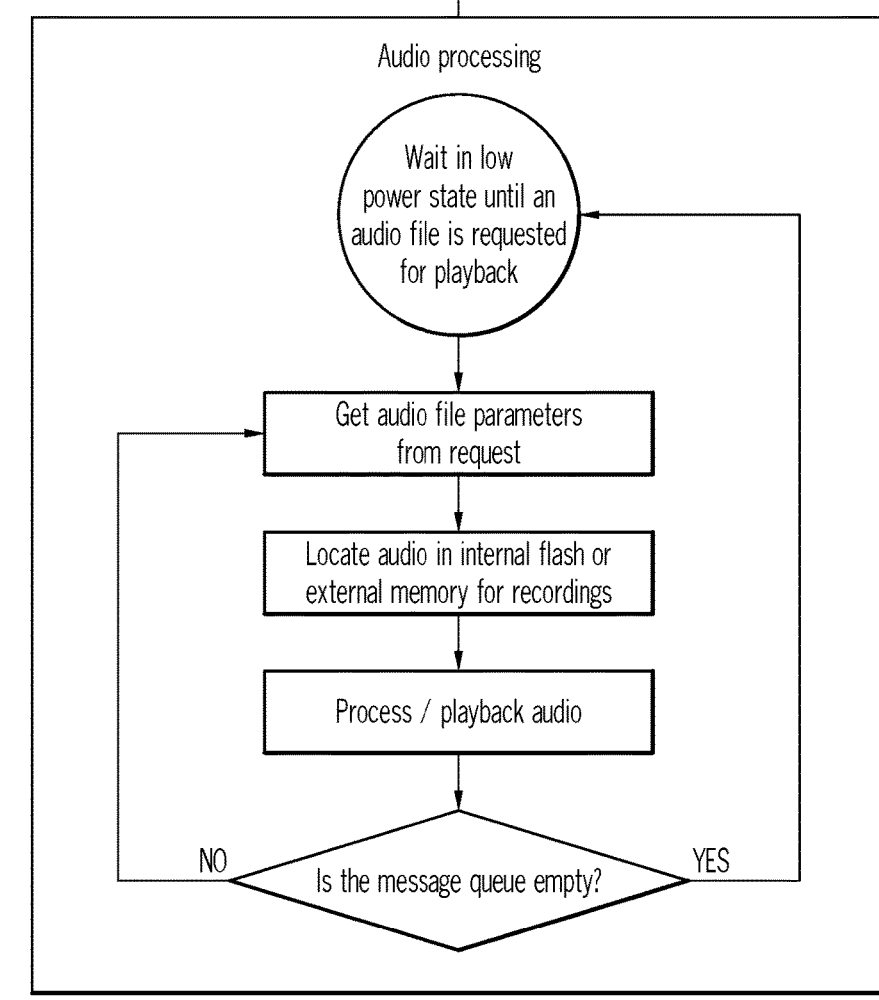
FIG. 10E is part of the flow chart indicated in FIG. 10D.
Figure 10F:
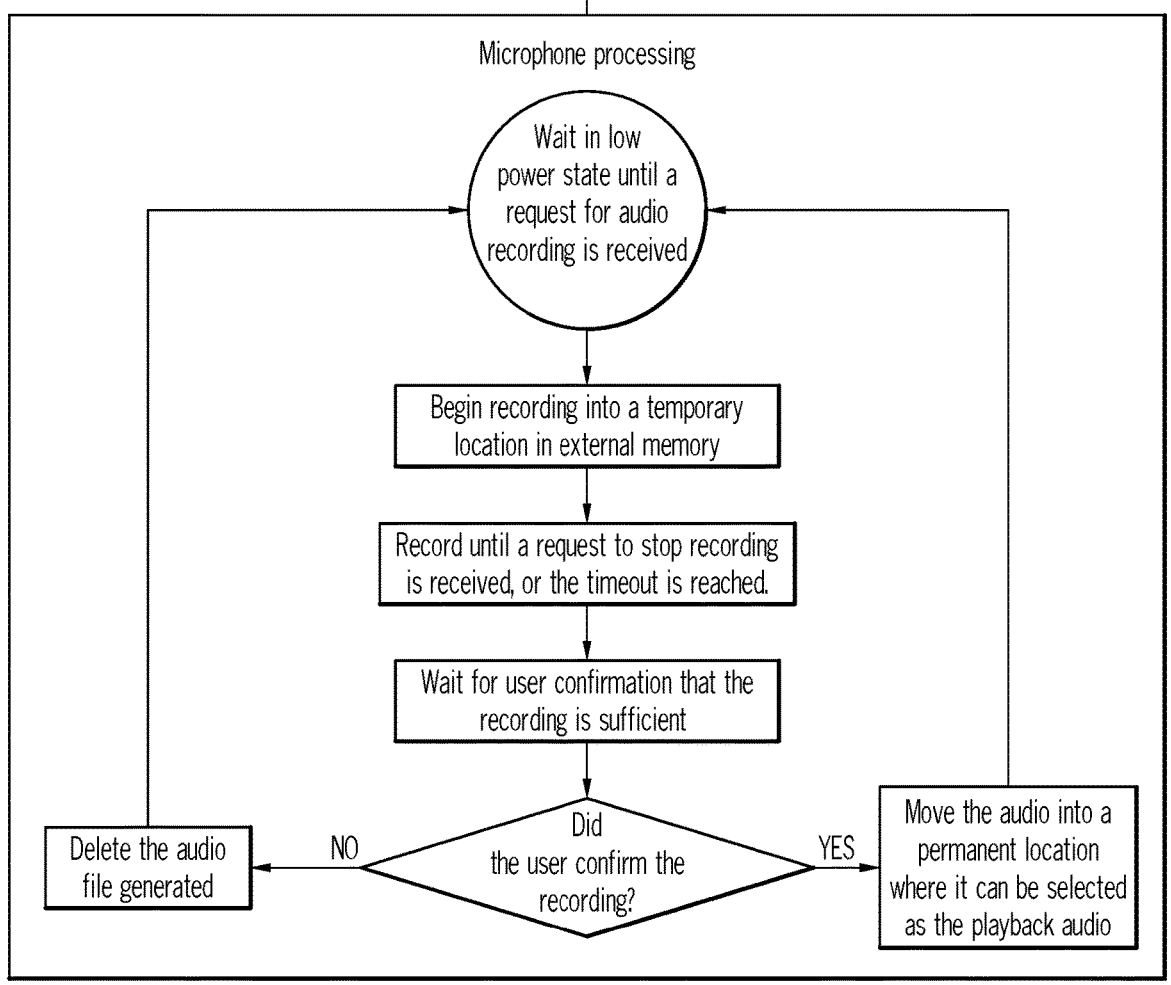
FIG. 10F is part of the flow chart indicated in FIG. 10E.
Figure 10G:
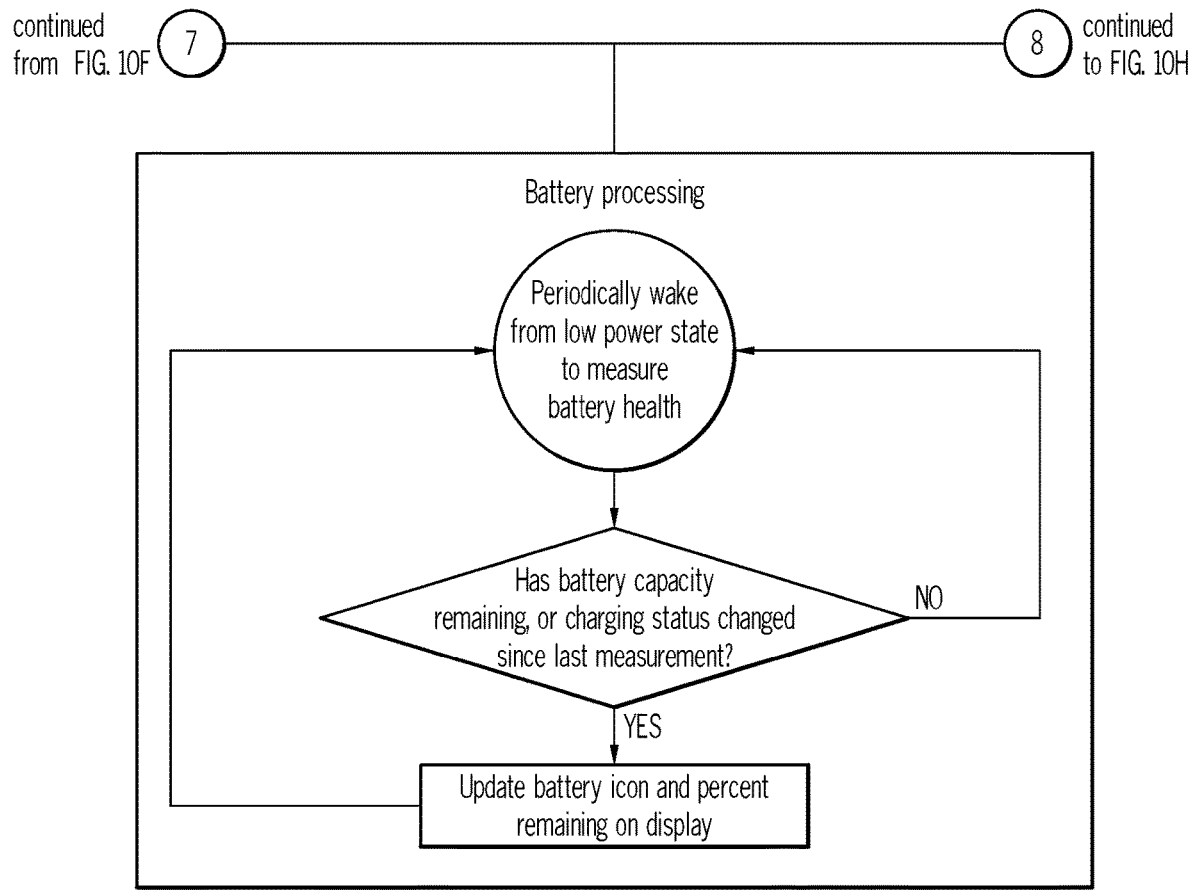
FIG. 10G is part of the flow chart indicated in FIG. 10F.
Figure 10H:
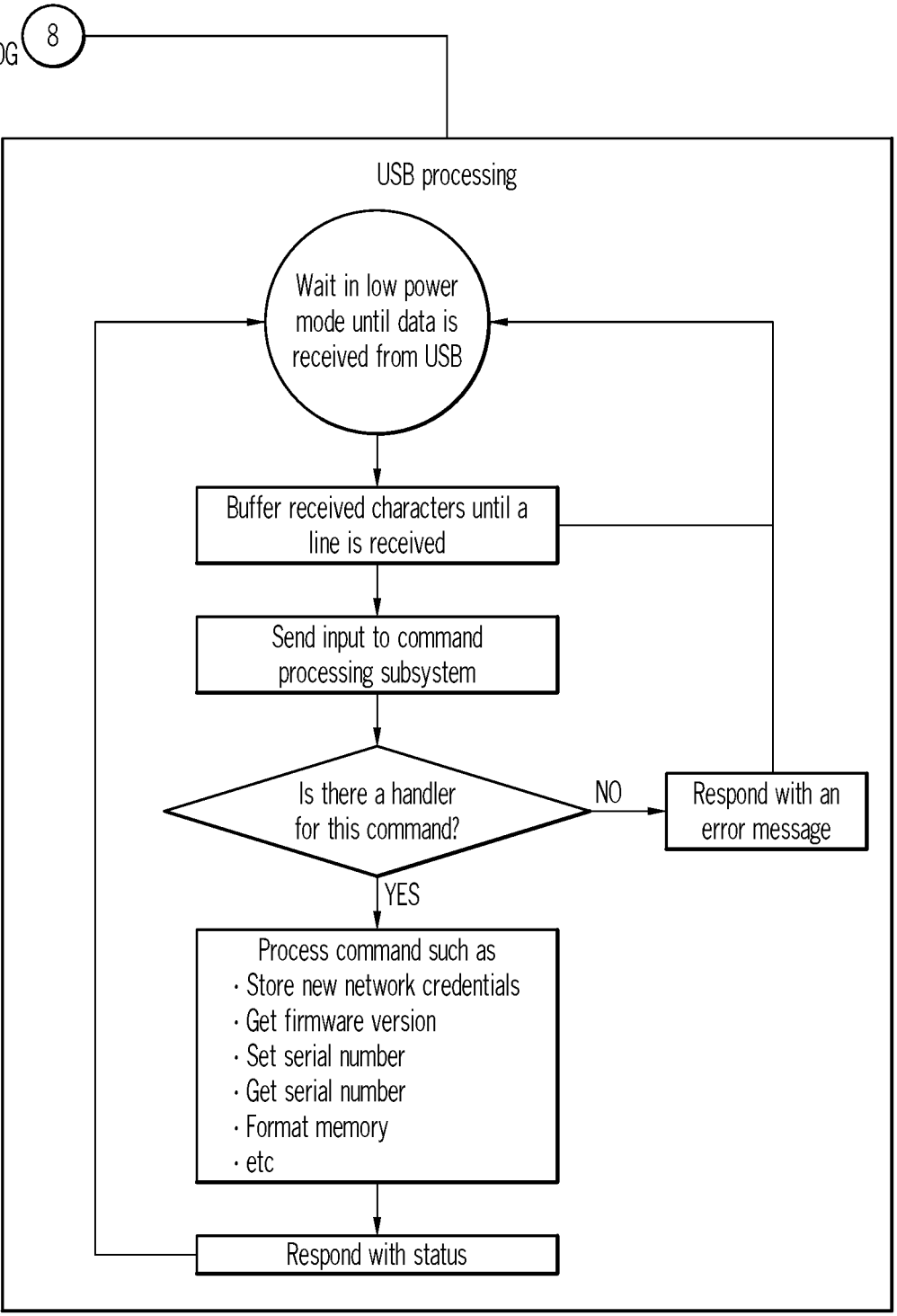
FIG. 10H is part of the flow chart indicated in FIG. 10G.

FIGS. 10D-10H illustrate other various processes for the phone simulator 26. For example, FIG. 10D illustrates an example of I/O processing such as controlling the volume and power settings of the phone simulator 26. FIG. 10E illustrates an example of audio processing. For example, the phone simulator 26 can play audio signal(s) during a training session to further instruct the user 40. FIG. 10F illustrates an example of microphone processing. For example, the phone simulator 26 can record audio of the user during a training session. FIG. 10G illustrates an example of battery processing. For example, the phone simulator 26 can monitor the battery health and update a battery icon on the display so the user 40 can charge the battery when necessary. FIG. 10H illustrates an example of USB processing. USB processing can be used to provision the phone simulator 26 and/or provide firmware updates or the like, or other data transfer.

In this manner, the system and method described herein can be used to provide realistic and repeatable training sessions to user 40, where the user 40 can receive immediate feedback. The system and method is easy to set up and safe to implement. In addition, the use of the phone simulator 26 provides a further realistic aspect to the system and method, and ensures that real emergency services are not contacted inadvertently so that the user 40 can use the system and method with confidence.

Having described the invention in detail and by reference to the preferred embodiments, it will be apparent that modifications and variations thereof are possible without departing from the scope of the invention.

What is claimed is:

1. A training device system comprising a mobile phone simulator including:
   a manually carryable housing;
   a controller positioned in the housing;
   a touch screen directly coupled to the housing and operatively coupled to the controller, wherein the touch screen is configured to display a numerical keypad, and wherein the touch screen is configured to receive manual inputs from a user; and
   a short-range radio transceiver positioned in the housing, wherein the simulator is configured to, in response to proper operation of the numerical keypad by a user, transmit a short-range radio signal via a mesh network by the short-range radio transceiver, wherein the proper operation by the user includes entering a series of numbers on the keypad corresponding to a phone number or simulated phone number;
   the system further including a network bridge, wherein the network bridge is configured to receive the short-range radio signal from the short-range radio transceiver, and responsively thereto cause the phone simulator to play an audio output.

2. The system of claim 1 wherein the series of numbers is 911.

3. The system of claim 1 wherein the touch screen selectively displays the numerical keypad and simulates a telephone calling functionality of a mobile phone, wherein the touch screen is pressure sensitive, and wherein the proper operation includes the user pressing a call button.

4. The system of claim 1 wherein the simulator is configured to play a ring tone in response to the proper operation of the numerical keypad by the user.

5. The system of claim 1 wherein the touch screen includes a dynamic electronic visual display and is configured to communicate the user inputs to the controller.

6. The system of claim 1 wherein the touch screen comprises at least about 90% of a surface area of one side of the phone simulator.

7. The system of claim 1 wherein the phone simulator further includes a microphone operatively coupled to the controller for receiving audio inputs, and wherein the controller is configured to at least one of store or process the audio inputs.

8. The system of claim 1 wherein the phone simulator further includes a speaker operatively coupled to the controller and configured to play stored audio signals.

9. The system of claim 1 wherein the system further includes a fire simulator operatively coupled to the network bridge and configured to dynamically display a simulated fire.

10. The system of claim 9 wherein the fire simulator includes a sensor configured to sense a real or simulated extinguishant directed at the simulated fire, and wherein the fire simulator is configured to modify the simulated fire based upon the sensed extinguishant.

11. The system of claim 1 wherein the system further includes a fire alarm and a cutoff switch, each of which is manually operable and operatively coupled to the network bridge, and wherein the system further includes an annunciator operatively coupled to the network bridge.

12. The system of claim 1 wherein the network bridge is configured to track some or all of the user's input into the mobile phone simulator, and wherein the network bridge is at least one of a controller, processor or computer.

13. The system of claim 1 wherein the transceiver is configured to at least one of transmit or receive short-distance wireless signals.

14. The system of claim 1 wherein the transceiver is configured to at least one of transmit or receive short-distance wireless signals based on Bluetooth mesh technology.

15. A training device system comprising a mobile phone simulator including:
a manually carryable housing;
a controller positioned in the housing;
a touch screen directly coupled to the housing and operatively coupled to the controller, wherein the touch screen is configured to selectively display a numerical keypad, and wherein the touch screen is pressure sensitive and configured to receive manual inputs from a user; and
a short-range radio transceiver positioned in the housing, wherein the simulator is configured to, in response to proper operation of the numerical keypad by a user, transmit a signal via the transceiver;
the system further including a network bridge, wherein the network bridge is configured to receive the signal from the transceiver, and responsively thereto cause the phone simulator to play an audio output, wherein the audio output includes speech or recorded speech indicating that the user has successfully completed an emergency call or simulated emergency call.

16. A training device system comprising a mobile phone simulator including:
a manually carryable housing;
a controller positioned in the housing;
a touch screen directly coupled to the housing and operatively coupled to the controller, wherein the touch screen is configured to selectively display a numerical keypad, and wherein the touch screen is pressure sensitive and configured to receive manual inputs from a user; and
a short-range radio transceiver positioned in the housing, wherein the simulator is configured to, in response to proper operation of the numerical keypad by a user, transmit a signal via the transceiver;
the system further including a network bridge, wherein the network bridge is configured to receive the signal from the transceiver, wherein the network bridge includes or is operatively coupled to a processor configured to track the user's use of the phone simulator and provide feedback to the user.

17. A training device system comprising a mobile phone simulator including:
a manually carryable housing;
a controller positioned in the housing;
a touch screen coupled to the housing and operatively coupled to the controller, wherein the touch screen is configured to selectively display a numerical keypad; and
a short-range radio transceiver positioned in the housing, wherein the simulator is configured to, in response to proper operation of the numerical keypad by a user, transmit a signal via the transceiver, wherein the system further includes a network bridge, wherein the network bridge is configured to receive the signal from the transceiver, and responsively thereto transmit an audio output to the transceiver to be played by the phone simulator, or to transmit a signal to the transceiver to cause the phone simulator to play an audio output stored on the controller, and wherein the signals from the transceiver to the bridge and from the bridge to the transceiver are short-range radio signals.

18. The system of claim 17 wherein the network bridge is at least one of a controller, processor or computer.

19. A mobile phone simulator including:
a manually carryable housing;
a controller positioned in the housing;
a touch screen coupled to the housing and operatively coupled to the controller, wherein the touch screen is configured to selectively display a numerical keypad; and
a short-range radio transceiver positioned in the housing, wherein the simulator is configured to, in response to proper operation of the numerical keypad by a user, transmit a signal via the transceiver, wherein the mobile phone simulator is configured to transmit only in a 2.4 GHz radio frequency band at a power of less than about 0.1 Watts, wherein the transceiver is configured to communicate via a personal area network, wherein the mobile phone simulator lacks a SIM card and lacks the ability to operatively connect to a SIM card, and wherein the mobile phone simulator lacks the ability to connect to a cellular network or cellular carrier network.

20. An apparatus including:
a manually carryable housing;
a controller positioned in the housing;
a touch screen coupled to the housing and operatively coupled to the controller, wherein the touch screen is configured to display a numerical keypad simulating a telephone calling functionality of a mobile phone;

a short-range radio transceiver positioned in the housing, wherein the apparatus is configured to, in response to proper operation of the numerical keypad, transmit a signal via the transceiver; and a speaker positioned in or directly coupled to the housing, operatively coupled to the controller and configured to play audible sounds;

wherein the apparatus lacks the ability to connect to a cellular network or cellular carrier network.

21. The apparatus of claim 20 wherein the audible sounds are a recorded or simulated ring tone and a recorded or simulated message mimicking an answering of an emergency call.

22. The apparatus of claim 20 wherein the housing is a generally rectangular prism shape which can fit into a hand of a user.

23. A training method comprising:

displaying or providing a simulated hazardous condition;

enabling a user to access a mobile phone simulator including a manually carryable housing, a controller positioned in the housing, a touch screen coupled to the housing and operatively coupled to the controller, and a short-range radio transceiver positioned in the housing; and in response to proper operation of the touch screen by the user simulating calling an emergency number, which includes entering on a keypad a series of numbers corresponding to a phone number or simulated phone number, and then pressing a call button, the mobile phone simulator transmitting a signal via the short-range transceiver wherein, in response to the proper operation of the touch screen by the user simulating calling the emergency number, the transceiver transmits a signal to a network bridge, which causes the network bridge to in turn communicate an indication that the user has successfully completed an emergency call or simulated emergency call.

* * * * *